Sept. 5, 1961 E. J. BIRKENBACH ET AL 2,998,855
HARROW WITH SHOCK ABSORBER DEVICE
Filed March 31, 1958
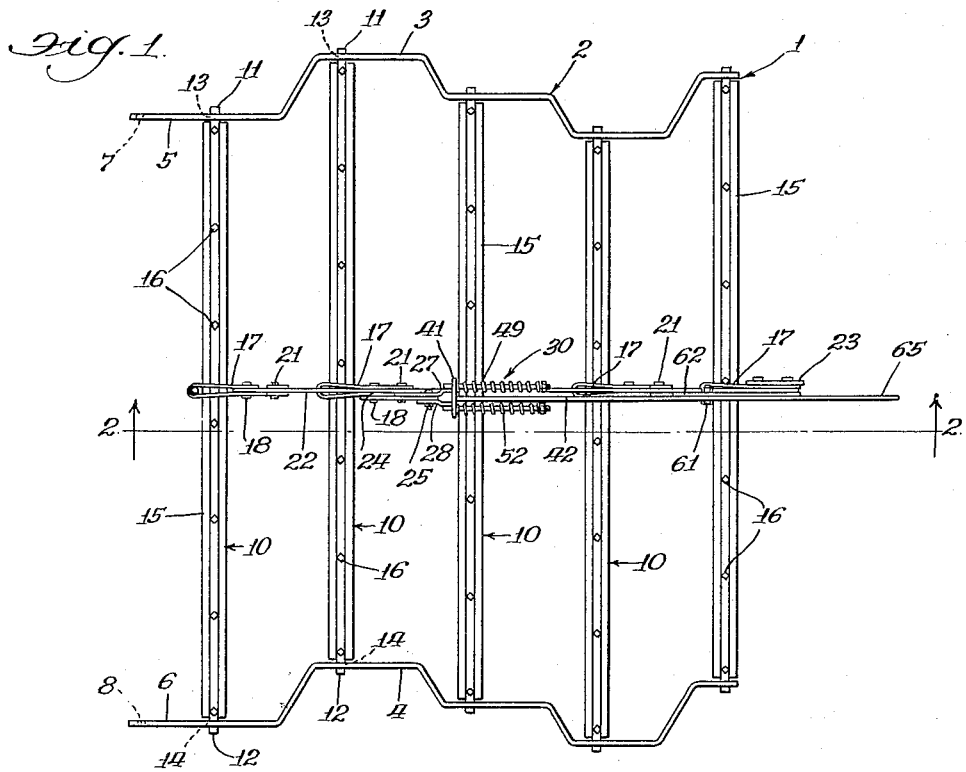
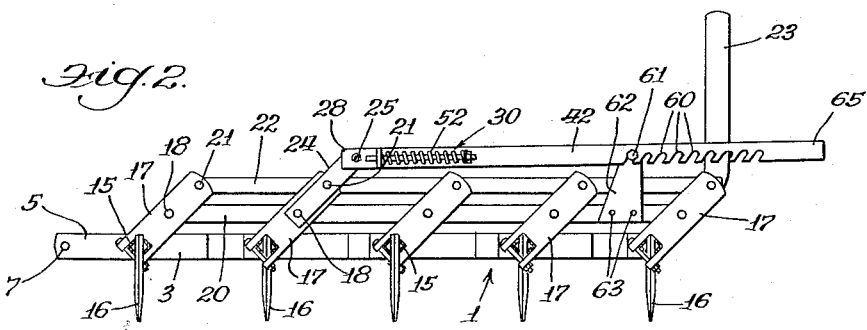
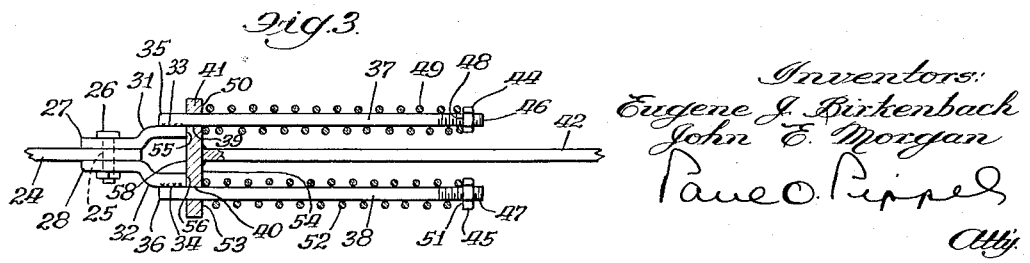
Inventors:
Eugene J. Birkenbach
John E. Morgan
Paul O. Pippel
Atty.

United States Patent Office

2,998,855
Patented Sept. 5, 1961

2,998,855
HARROW WITH SHOCK ABSORBER DEVICE
Eugene J. Birkenbach, Des Plaines, and John E. Morgan, Chicago, Ill., assignors to International Harvester Company, Chicago, Ill., a corporation of New Jersey
Filed Mar. 31, 1958, Ser. No. 725,413
5 Claims. (Cl. 172—635)

This invention relates generally to agricultural implements and more specifically to harrows.

The object and general nature of the present invention is the provision of a spike-toothed harrow incorporating a novel shock absorbing device and a simplified linkage for transmitting shock loads from the tooth bars of the harrow to the shock absorbing device.

A more specific object of the invention is to provide an efficient and effective linkage for setting the angle of the tooth bars and which linkage includes a spring device for reducing shock loading on the harrow tooth bars upon their striking an obstruction.

These and other objects of the invention will become more apparent from the specification and the drawings wherein:

FIGURE 1 is a plan view of a harrow incorporating the invention;

FIGURE 2 is a cross sectional view taken substantially on the line 2—2 of FIGURE 1; and FIGURE 3 is an enlarged plan view of the shock absorbing device partially in horizontal section.

Describing the invention in detail, the harrow section is indicated in its entirety by the reference numeral 1 and includes a frame 2 made up of right and left-hand side rails 3 and 4 which have front end portions 5 and 6 provided with eyes 7 and 8 which provide hitching attachment to a draft frame such as is well known to those skilled in the art.

The harrow includes a plurality of tooth bars 10 which extend between the members 3 and 4 and are provided with end pivots 11 and 12 which journal in horizontal openings 13 and 14 in the bars or side members 3 and 4. It will be realized that there are a series of openings 13 in the bar 3 and similarly spaced openings 14 in the bar 4 and that the tooth bars 10 extend between corresponding openings 13 and 14 and are spaced transversely of each other and that is in the direction of movement of the harrow.

Each tooth bar comprises a rigid beam 15 to which are connected a plurality of dependent teeth 16. An upwardly extending lever arm 17 is connected to each tooth bar beam member 15 approximately at the center thereof and the arms 17 are aligned in a fore and aft direction and are pivotally connected intermediate their ends at 18 to a lower set bar 20 at longitudinally spaced points thereon and the arms 17 are pivotally connected at their upper ends as at 21 to longitudinally spaced points of an upper set bar 22 which extends parallel to the bar 20 and the bars 20 and 22 are generally parallel with the frame 2 of the harrow section.

The rearwardmost arm or extension 17 is connected to an upwardly extending set lever 23 and the second arm from the front is provided with an extension 24 which connects with the related member 17 at the points 18 and 21. The extension lever arm 24 projects upwardly above the upper set bar 22 and at its upper end is pivoted as at 25 by means of a pin 26 between a pair of right and left ears 27 and 28 adjacent to the forward ends thereof.

The ears or connecting means 27 and 28 form part of the cushioning or shock absorbing device generally designated 30 and have their rear portions offset as at 31 and 32 away from each other and are weld connected at 33 and 34 to the forward extremities or first ends 35 and 36 of the bolts or rods 37 and 38, the said rods loosely passing through openings 39 and 40 at opposite ends of a cross member 41 of the T-shaped adjusting bar 42.

The rods 37 and 38 are provided with adjusting nuts 44 and 45 which are threaded on the rear or second ends 46, 47 of the rods 37 and 38 and the nut 44 bears as at 48 against the rear end of a compression spring 49, the forward end of which bears as at 50 against the backside of the member 41. Similarly the nut 45 engages as at 51 the rear end of a compression spring 52 and the forward end of the spring 52 seats as at 53 against the said backside 54 of the cross member 41. It will be observed that the springs 49 and 52 are under compression which is equalized by suitable adjusting to the nuts 44 and 45, and that the said springs urge the bolts 37 and 38 rearwardly until the rear edges or abutment surfaces 55, 56 of the outside portions 31 and 32 on the rear ends of the ears 27 and 28 seat and engage against the forward side 58 of the member 41.

The locking or adjusting bar 42 is provided on its under edge with a plurality of downwardly open serrations or slots 60 along the length thereof which engage with a horizontal pin 61 which is provided on the upper end of a bracket 62 which at its lower end is connected rigidly as at 63 to the lower set bar 20 in an area intermediate the rearwardmost arms 17 and the one immediately thereahead. It will be readily observed that inasmuch as the entire holding and setting structure rotates about the axes of pivot of the tooth bars 10 that the lower set bar 20 moves the least distance fore and aft as the tooth bars swing and that the upper tooth bar proportionately moves much further and that the locking bar 42 moves substantially more than the lower set bar.

On the basis of this differential in movement and assuming that the harrow is set in the position shown in FIGURE 2 and is being pulled forwardly at the points 7 and 8 the teeth of any bar upon striking an obstruction of course tend to swing rearwardly, thus moving or swinging arms 17 forwardly which of course would also move the extension 24 forwardly and carry with it the ears 27 and 28 disengaging their rear ends from the plate 41 and pulling the rods 37 and 38 forwardly with attendant compression of the springs 49 and 52 while imposing a load longitudinally in tension on the bar 42, which load in turn is imposed on the bar 20 and thus maintains it in a fore and aft direction. This feature of orienting the loads fore and aft in the direction of travel of the harrow has been found to be eminently successful in maintaining the harrow engaged from front to rear with the ground without the normally tendency for the rear end of the harrow to rise, as is the case with all of the other cushioned harrow structures known to applicants.

In order to reset the harrow and in order to change the inclination of the teeth the operator grasps the handle 23 while at the same time lifting the adjusting bar 42 by grasping the rear end 65 and lifting it up to disengage any of the slots 60 from the pin 61 and reengaging the pin 61 with any other slots forwardly or rearwardly of the particular one in which the bar had been previously set. In this way by moving the adjusting bar 42 forwardly, the teeth 16 are given a negative inclination and by moving the bar 42 rearwardly, the teeth of course would maintain a more positive inclination.

What is claimed is:

1. A harrow comprising a pair of end rails, rockably mounted tooth bars carried thereby, an upstanding lever on each tooth bar, a pair of upper and lower set bars pivotally connected to each of said levers at vertically spaced points, an extension on one of said levers projecting upwardly above said upper set bar, an upstanding bracket connected to the lower set bar and having a transverse pin, and a spring-loaded adjusting bar assembly pivotally connected at one end to said lever extension and having a series of notches adjacent to its opposite end for selective engagement with said pin, said assembly disposed in substantial horizontal alignment with said set bars.

2. A spike-toothed harrow comprising a pair of end rails, tooth bars connected to said end rails for rockable movement with respect thereto, means including a parallelogram linkage comprising upper and lower beams operatively interconnecting all of said tooth bars for movement in unison, and means including a shock absorbing assembly in said parallelogram linkage for yieldably resisting deflection of said tooth bars and comprising a bracket rigidly connected to the lower beam and extending above the upper beam, an arm connected to one of the tooth bars and extending above the upper beam, and said assembly extending between said bracket and arm and pivoted thereto and disposed generally parallel to said beams.

3. A spike-toothed harrow comprising a pair of end rails, a plurality of tooth bars mounted for rocking movement on said end rails, an upstanding arm fixed to each of said tooth bars, a pair of rigid upper and lower parallelogram links operatively interconnecting all of said arms, an extension extending above said links and connected to one of said arms, a rigid element connected only to the lower link and spaced lengthwise of the link with respect to said arm extension between a pair of said arms, and a yieldable adjusting means pivotally connected to said arm extension and to said rigid member and comprising a T-shaped bar comprising a shank portion extending transversely of said bars and a transverse portion, a rod at each side of said shank portion having a first end projecting through an aperture in the transverse portion and having a second end with abutment means, spring means on each rod compressed between the transverse portion and respective abutment means, and connecting means connected to the first ends of said rods and having abutment surfaces engageable with said transverse portion.

4. A harrow comprising a pair of end rails, a plurality of tooth bars mounted for rocking movement on said rails, arms fixed to each of said tooth bars, said arms being arranged in alignment transversely of said tooth bars, upper and lower links pivotally interconnecting all of said arms, one of said arms having an extension projecting above said upper link, a bracket spaced lengthwise of said links from said arms and connected to the lower link and projecting upwardly above the upper link, a T-shaped adjusting bar having a shank portion extending above and in vertical alignment with said links and adjustably and pivotally associated with said bracket, said adjusting bar having a cross member with an aperture adjacent to each end, a rod extending through each aperture, means operatively interconnecting one end of each rod to the lever extension, abutment means on each rod spaced from said cross member, and spring means compressed between said abutment means on each rod and said cross member.

5. In a harrow comprising a rigid longitudinal element and a plurality of tooth bars transverse to said element and pivoted thereto, and operating parallelogram linkage associated with said bars for setting them in a plurality of working positions and including upper and lower links extending substantially perpendicular to the tooth bars, a pair of upstanding members, one connected to each of said links and simultaneously differentially movable with respect to each other, and means including spring means interposed between said members for yieldably resisting said movement, said members having pivotal connections with said first-mentioned means at points lying in a horizontal plane substantially parallel to said longitudinal element and vertically spaced therefrom.

References Cited in the file of this patent
UNITED STATES PATENTS

| | | |
|---|---|---|
| 638,383 | Duvall | Dec. 5, 1899 |
| 2,236,780 | Oerman | Apr. 1, 1941 |